May 1, 1962 N. J. MENOLASINO ET AL 3,031,819
DISPENSER MECHANISM
Filed April 14, 1958 3 Sheets-Sheet 1

INVENTORS
Nicholas J. Menolasino
Dominic Menolasino
BY
Williams & Hersh
Attorneys May 1, 1962 N. J. MENOLASINO ET AL 3,031,819
DISPENSER MECHANISM
Filed April 14, 1958 3 Sheets-Sheet 3
FIG. 7
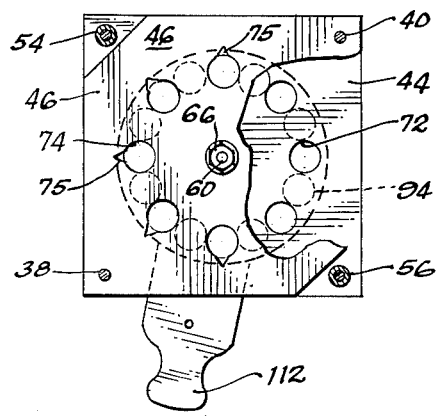
FIG. 8
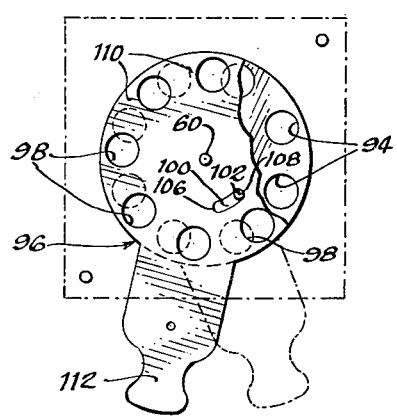
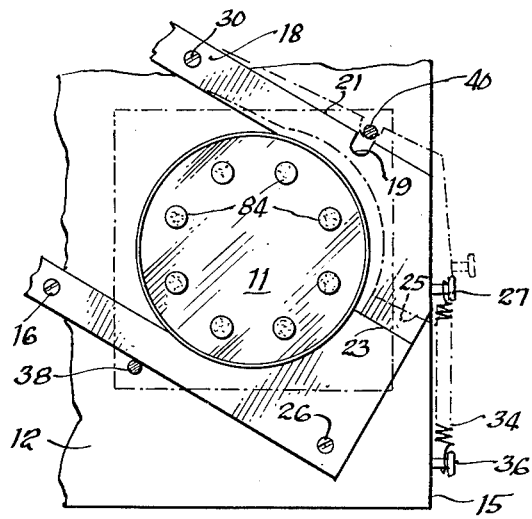
FIG. 9
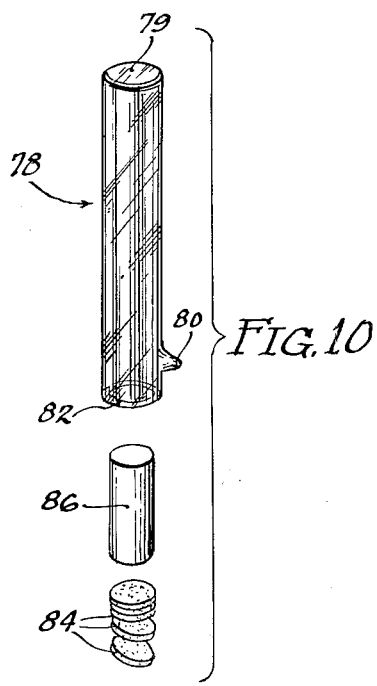
FIG. 10
INVENTORS
Nicholas J. Menolasino
BY Dominic Menolasino
Ooms, McDougal, Williams & Hersh
Attorneys United States Patent Office 3,031,819
Patented May 1, 1962

3,031,819
DISPENSER MECHANISM
Nicholas J. Menolasino and Dominic Menolasino, both of 1313 N. 14th Ave., Melrose Park, Ill., assignors of one-fourth to Allen S. Belcove and one-fourth to Seymour Santow
Filed Apr. 14, 1958, Ser. No. 728,415
12 Claims. (Cl. 53—237)

This invention relates to a machine for dispensing biological and chemical testing elements and positioning them in a predetermined relationship with respect to each other.

Recently, methods for determining the relative effectiveness of various biological agents for the alleviation or cure of sickness or diseases have been developed. These methods involve the use of discs treated with such biological agents, usually antibiotic or chemotherapeutic in nature, hereinafter referred to collectively as "antibiotic agents," as by the impregnation of an absorbent paper followed by drying. In this way the biological agent can be stored for a considerable period prior to use. When a particular organism is to be tested to determine which of the many agents are the most effective, the organism or culture is provided on a suitable medium. Then the impregnated discs are placed on the surface of the material and the result is incubated. The organism will grow to the periphery of the disc if the agent is ineffective. There will be a clear zone surrounding the disc containing an agent which is effective to destroy or retard the growth of the particular organism.

The developement of numerous recently developed antibiotic agents and the occurrence of newer strains of bacteria which are resistant to some of the previously effective antibiotics has made it necessary to employ more than one disc when testing a particular bacterial culture, in order to determine as rapidly as possible which antibiotic agent will prove most effective.

This need for testing numbers of agents has led to the development of a flat sheet of absorbent material, usually paper, wherein spaced portions of this sheet are impregnated with the different agents. Since it is necessary to detect the formation of a clear zone around the effective agent, this sheet is usually in the form of a ring with spaced impregnated enlargements uniformly distributed around its periphery, or with inwardly or outwardly projecting arms which terminate in impregnated portions distributed around its periphery. Alternatively, some sheets comprise a central portion having the outwardly projecting arms extending from its center.

In use, the sheet is inserted in a Petri dish having the culture as described above. After the period of incubation is over, an inspection of the various impregnated portions will indicate in a comparative way which agent was most effective.

There were many advantages in combining these various bacterial agents on one disc. For one thing, it was easier and quicker to position one sheet in a Petri dish than to insert a plurality of discs in a predetermined spaced relationship there. In addition, the quick insertion of the single sheet into the Petri reduced the possibilities for contamination.

Opposed to these important advantages were serious disadvantages. First of all, it imposed a certain rigidity upon the variety and concentration of bacterial or other agents which were to be tested. These sheets are generally manufactured and impregnated at a commercial biological laboratory and consequently these laboratories concentrate on making the sheets with the combination of antibiotic agents which experience shows to be most in demand. Circumstances, however, often arise when it is desirable simultaneously to test varieties and concentrations of antibiotic agents which are not combined on any single sheet supplied by these laboratories, and the lack of availability of the desired combinations often cause objectionable delays and inconveniences.

Another factor to consider is that the number of antibiotic and other agents which can be tested simultaneously is limited by the requirement that the zones of inhibition around each effective agent do not interfere with each other. It is evident that increasing the number of antibiotic impregnated portions on a single sheet would involve an undesirable decrease in the distance between these portions, and this would increase the likelihood that the zones of inhibition of the most effective agents would interfere with each other. These considerations impose a limit upon the number of antibiotics or agents which can be tested at one time and rigidly fix the separation of the impregnated portions on the sheet. Further, there are times when it is desirable to only test for the effectiveness of one, two, or three antibiotics or agents so that considerable waste takes place where use is limited to a predetermined combination.

What is needed, therefore, and comprises the principal object of this invention, is a device which combines the advantages of using a single sheet of material impregnated with a variety of biological or other agents but overcomes the disadvantages of using a rigid combination of biological testing agents which are disposed a fixed distance apart.

Another object of this invention is to provide a device for simultaneously distributing and positioning one, two, or a variety of impregnated biological testing agents.

Still another object of this invention is to provide a dispensing container for individual impregnated discs which can be easily and quickly connected and disconnected from a dispensing mechanism.

Yet another object of this invention is to provide a dispensing machine for simultaneously distributing a variety of impregnated biological testing agents which is provided with means for altering the distance between the agents being tested.

Yet another object of this invention is to provide a contamination-resistant dispensing mechanism for a container for resisting containation of the material stored therein.

These and other objects of this invention will become more apparent when read in the light of the accompanying drawings and specifications wherein—

FIGURE 7 is a sectional view taken on the line 7—7 of FIGURE 2 and looking in the direction indicated;

FIGURE 8 is a sectional view taken on the line 8—8 of FIGURE 2 and looking in the direction indicated;

FIGURE 9 is a sectional view taken on the line 9—9 of FIGURE 2 and looking in the direction indicated, and FIGURE 10 is an exploded perspective view showing the dispensing container in association with a cylindrical weight and the impregnated discs.

Figure 1:
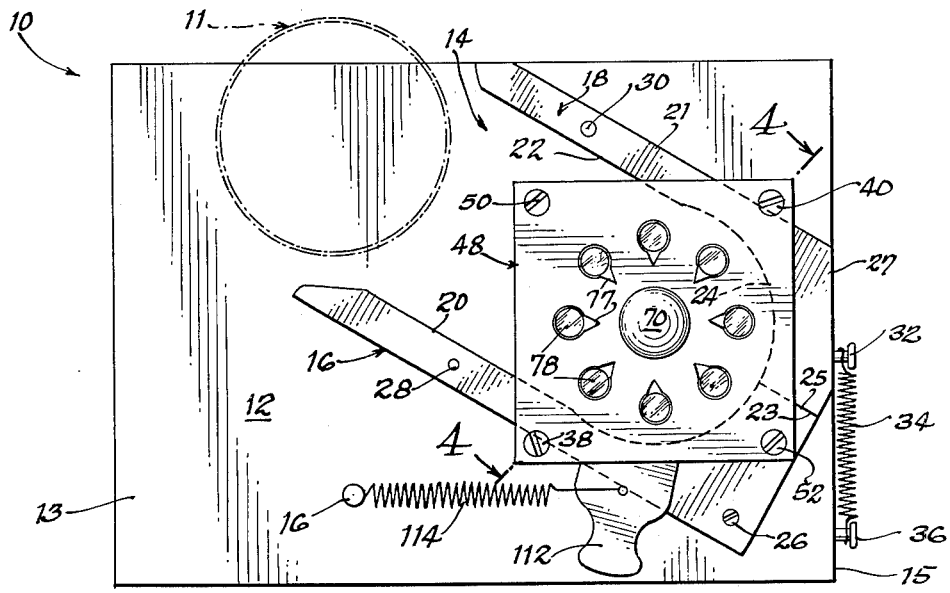
FIGURE 1 is a plan view of the machine for distributing biological agents constructed according to this invention.
Figure 2:
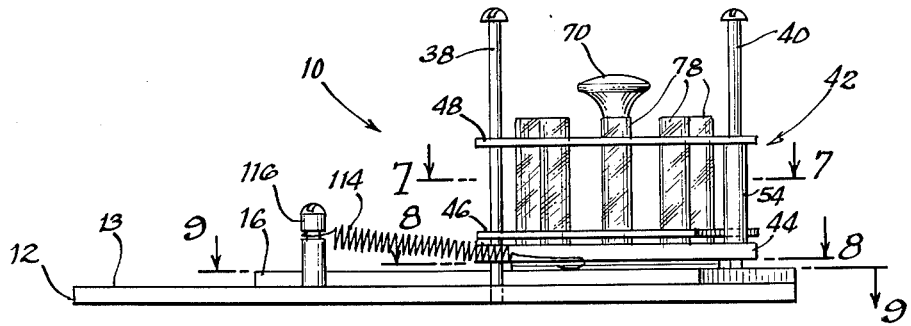
FIGURE 2 is a side elevational view of the machine disclosed in FIGURE 1.
Figure 3:
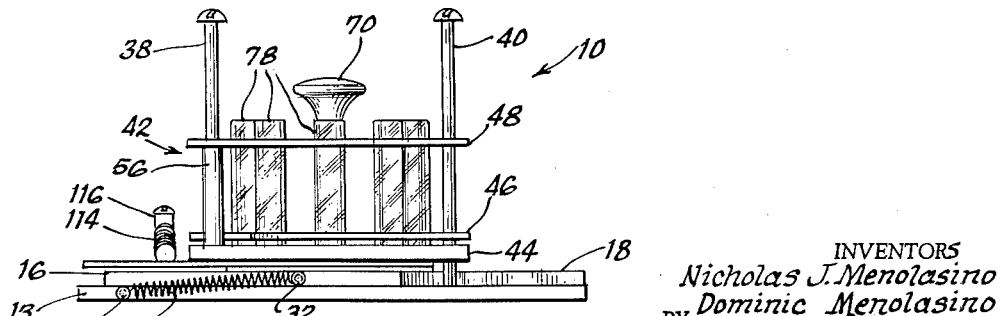
FIGURE 3 is a rear elevational view of the machine disclosed in FIGURE 1.

Referring now to FIGURE 1 of the drawings, a machine for simultaneously dispensing one or any desirable combination of paper discs treated with biological agents and distributing them in a predetermined order or pattern is indicated generally by the reference numeral 10. This dispensing machine comprises a base member 12 which has a guide track indicated generally by the reference numeral 14 mounted thereon. The guide track is defined by members 16 and 18 which are secured to the top surface 13 of the base member. These guide members 16 and 18 have opposed guide edge surfaces 20 and 22 which are parallel to each other for a portion of the guide track, and then curve toward each other terminating in abutting end portions 23 and 25. This arrangement provides an arcuate seat 24 for precisely positioning a Petri dish 11, or any other article-receiving container on the base member 12. As seen in the drawings, the seat 24 is substantially semi-circular to conform to the circular shape of the Petri dish, but it is apparent that since the function of the seat is to position the container, other geometrical shapes may also prove to be useful.

Guide member 16 is rigidly mounted on base member 12 by means of screws 26 and 28. Guide member 18, on the other hand, is pivotally mounted on a pivot screw 30 on the base member. Its pivotal freedom is limited by the engagement of the base of a recess 19 formed in one edge 21 of the guide member 18, with the stem of the guide bolt 40, see FIGURE 9. A lug 32 is integrally secured to another edge 27 of the guide member projecting outwardly therefrom. A coil spring 34 is connected between this lug 32 and a lug 36 projecting out from the edge 15 of the base member 12. This arrangement acts to bias the arcuate or seat portions of the guide track together and permits the arcuate seat 24 to automatically adjust itself to receive and center any Petri dish 11 on the base member 12, if it has a size range within the limitations shown by the dotted lines in FIGURE 9.

A vertically disposed guideway is mounted on base member 12, and in the embodiment shown this guideway is formed by two spaced parallel bolts or rods 38 and 40, which as seen in FIGURE 4 are threaded at one end and are screwed into threaded holes in the base member 12. A support, indicated generally by the reference number 42, is slidably mounted on the guide rods 38 and 40 for movement toward and away from the base member 12 for purposes to be described below. This movement is indicated by the dotted lines in FIGURE 4.

The support, in the particular embodiment shown, is formed from three substantially parallel support plates 44, 46 and 48. All these support plates are provided with a pair of aligned guide rod-receiving openings 43 at their diagonally opposite corners to permit the support to move as a unit on the vertical guideway. In the drawings, these support plates appear substantially rectangular, but this is not critical and other shapes may prove useful. As seen in FIGURES 1, 2, and 3, support plate 48 is mounted directly on support plate 44 by means of screws 50 and 52 which extend from diagonally opposite corners of support plate 48 through spacers 54 and 56 into threaded engagement with screw holes formed in support plate 44. As seen in FIGURE 7, these spacers do not extend through support plate 46, because the adjacent corners of that plate have been cut away.

An additional first plate member 58 is connected to the support 42 in the embodiment shown. This plate member is circular in shape to conform to the shape of a Petri dish 15, for purposes to be described below, see FIGURE 4. However, this particular shape is not critical and others may prove useful.

A connecting bolt 60 extends through the centers of plate member 58 and support plates 44 and 46. As seen in FIGURE 4, this connecting bolt also extends through the center of a spacer 62 for holding support plate 46 in a spaced parallel relationship with support plate 44. Plate member 46 is biased against the spacer 62 by means of the coil spring 64 which is compressed between the lock nuts 66 and washers 67 and 68 on the connecting bolt 60, for purposes to be described below. A handle 70 is screwed onto the support plate 48 by a bolt 71 for either raising and lowering the entire support 42 and plate member 58 on the guide rods 38 and 40 in order to position or remove a Petri dish on the base member 12, or as will be described below, for handling the support 42 and its attached mechanism independently of the base member 12 and the guide portion 14.

A plurality of aligned container receiving openings 72, 74, and 76, all substantially similar in size, are formed on support plates 44, 46, and 48, see FIGURE 4. The openings in each plate are disposed in uniformly spaced relationship along the periphery of a circle in this particular embodiment, and these circles are in alignment with each other, see FIGURE 1. Although this arrangement has proven very useful and practical, for reasons which will be apparent below, it is not critical, and the openings can be disposed along any other path. These openings are generally circular in shape to conform to the shape and size of a cross-section of the containers to be mounted on the support, but it is evident that numerous other configurations are possible.

As seen in FIGURES 1 and 4, the openings 74 and 76 in support plates 46 and 48 are provided with substantially identical, radially projecting and somewhat triangular guide and locking recesses 75 and 77. These recesses, in this particular embodiment, extend in opposite directions with an angular separation of 180 degrees, but angular differences of less than 180 degrees may be desirable under some circumstances.

A plurality of elongated tubular cylindrical glass-dispensing containers 78 are mounted on the support 42 and extend through the openings 72, 74, and 76, as shown in FIGURE 4. Each container has a closed end 79 and is provided with a guide and locking abutment 80 integrally formed on its outer surface adjacent the open mouth 82. This abutment projects radially outwardly from the container and it corresponds in size and shape to the guide and locking recesses 75 and 77 so it can pass therethrough, see FIGURE 10. As seen in FIGURE 1, the diameter of the openings and the diameter of the containers closely correspond to each other, but the addition of the guide and locking abutment 80 on the containers makes them too large to pass through these openings in the support plates 46 and 48 unless, as the containers move through each support, they are sucessively rotated so that the abutments 80 are aligned with the guide recesses 75 and 77. This means that in order to mount the containers 78 on the support 42, each container is first rotated so that the abutment 80 passes through the guide recess 77 in support plate 48. Then, in order to move the container 78 through the openings 74 in support plate 46, it must again be rotated by ½ of a revolution so that the abutment 80 can pass through the guide recess 75. The angular offset between recesses 75 and 77 is not essential. What is important is the means for locking each container separately and independently in the dispenser. For this purpose, the containers are rotated to move the abutments 80 out of alignment with the recess 75 and into the space 81 between the support plates 44 and 46 to lock the container therebetween. This is possible because, as seen in FIGURE 4, spacer 62, which is substantially the same height as the abutments 80, maintains the required separation between these support plates. Since the support plate 46 is spring biased against spacer 62 to maintain the required separation between support plates 44 and 46, it is evident that the space 81 is adjustable in height, and consequently it can accommodate abutments 80 which are somewhat larger than their designed dimension. This is important because it means that the production standards for the containers do not have to be very precise.

and so production variations in container size will not make the containers useless for the purposes of this apparatus.

Figure 4:
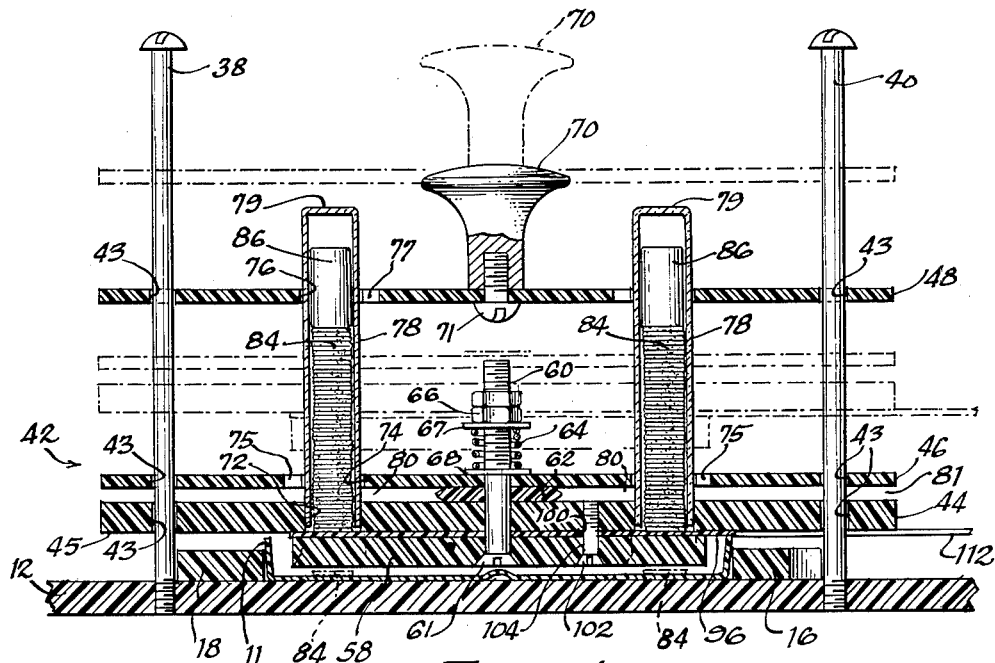
FIGURE 4 is a sectional view taken on the line 4—4 of FIGURE 1 and looking in the direction indicated.
Figure 6:
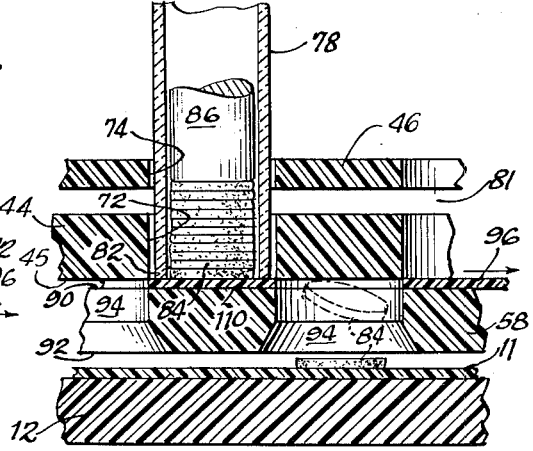
FIGURE 6 is a view similar to FIGURE 5 but enlarged and showing the position of part of the machine in a discharge position.

As seen in the drawings, the containers are all similar in size and shape so that when they are mounted on the support in the manner described above, their mouths 82 will either be in the same plane as the planar surface 45 of the support plate 44 as shown in FIG. 6, or they will be recessed in the openings 72 in support plate 44 as shown in FIG. 4. If the mouths of the containers 78 are recessed in support plate 44, then the support plate 44 itself is considered to constitute an extension of the containers, so that the true mouth of the containers would be at openings 72 in the surface 45.

With the support constructed as described above, it is evident that the containers 78 can be easily and removably mounted thereon. Furthermore, the support plate 48, in addition to its function of supporting the end of the container 79 remote from the mouth 82, has the additional function of acting as a safety lock because if the support 42 and the containers 78 are positioned in such a way that the containers fall away from the support plates 44 and 46, they still cannot fall through the support plate 48 unless the container is deliberately rotated to permit it. It can therefore be seen that the support can be conveniently used to removably hold any kind of cylindrical elements having the above-described abutments formed therein in spaced parallel relationship with each other, independently of the dispensing mechanism.

Although the principles of this invention can be applied to dispensing and distributing anything, the apparatus was designed for testing microbial reactions, and is used most frequently for testing the effectiveness of antibiotics. Accordingly, each container is filled with a stack of paper disks 84 which are impregnated with some antibiotic. The antibiotic in each container is different from those in other containers either in chemical composition or concentration.

In the embodiment shown, the base member is horizontal and the containers project upwardly therefrom in perpendicular relationship to the base member. This arrangement permits the disks in the containers to be urged toward the mouth 82 of the containers by means of a simple cylindrical weight 86. This weight is positioned on top of the stack of disks 84 adjacent the closed end 79 of the container 78, see FIGURES 4 and 10. It is apparent that if the orientation of support 42 was different so that the disks had to be urged upwardly, for example, other means such as a biasing spring could be positioned inside the container to provide the required force.

As stated above, the object of this invention is to simultaneously dispense and distribute one of these paper disks from each container and deposit them on an article-receiving container, usually a Petri dish, in a predetermined order. Since the article or disks to be dispensed may be stored for long periods of time in these containers, it might be important to prevent their contamination from exposure to air. This means that the dispensing mechanism employed should be contamination resistant.

The contamination-resistant dispensing mechanism employed in this device includes the abovementioned first plate members 58 which are connected to support 42 and are associated with the containers 78 as described above. This plate member has opposed upper and lower surfaces 90 and 92, see FIGURE 6. Although in this embodiment these opposed surfaces are parallel, this is not a necessary condition and non-parallel opposed surfaces are contemplated. Plate member 58 is also provided with outlet openings 94 which are disposed on the periphery of a circle which is parallel to and has the same diameter as the circles defined by the openings 72, 74, and 76 on support plates 44, 46, and 48. However, the outlet openings 94 are offset from and intermediate the openings 72 in support plate 44, whereas the openings 72, 74, and 76 are all aligned with each other, see FIGURE 5. These outlet openings 94 extend through the first plate member and in the embodiment shown are perpendicular to the opposed surfaces 90 and 92. This perpendicular arrangement is not a necessary condition, because under some circumstances it may be desirable for these outlet openings to be inclined to either one or both of the opposed surfaces of the first plate member.

Figure 5:
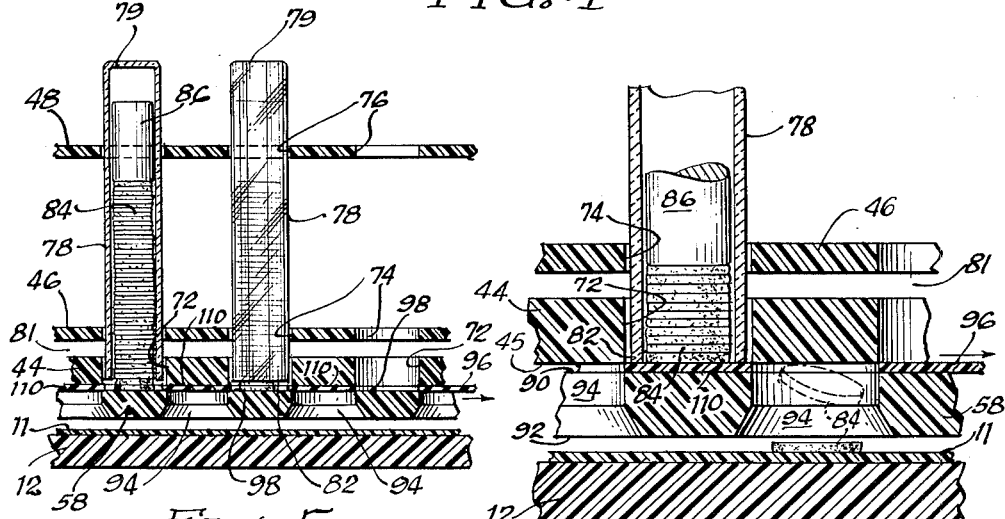
FIGURE 5 is a developed elevational view of an enlarged portion of the machine showing the position of parts of the machine in a non-discharge position.

As seen in FIGURES 4, 5, and 6, a second plate member 96 formed from thin, somewhat resilient, sheet material and having a thickness substantially equal to the thickness of the individual disks 84 inside the containers, is movably mounted between the lower surface 45 of the support plate 44 and the adjacent surface 90 of the first plate member 58. Surface 90, as seen in FIGURE 4, is substantially parallel to surface 45 of support 44, but though this arrangement is both useful and practical, under some circumstances a non-parallel relationship may be used. The second plate member 96 is generally circular in shape, with an offset portion to be described below, but the particular configuration of this plate is not important. As seen in FIGURES 4 and 8, this plate member 96 is rotatably mounted on the connecting bolt 60 which extends centrally therethrough. The coil spring 64 described above exerts a force between the head 61 of the bolt 60 and the support plate 46, which produces sufficient tension on the second plate member 96 to prevent it from accidentally rotating on the bolt 60. This arrangement spaces the surface 90 of the first plate member 58 from the lower surface 45 of the support plate 44 by a distance substantially equal to the thickness of the disks carried in the containers, for reasons to become apparent below.

The second plate member 96 is provided with a plurality of disk-receiving openings 98, corresponding in number to the number of containers adapted to be mounted on the support 42. These openings are sized to receive the articles stored in the containers and, as seen in FIGURES 5, 6, and 8, these openings are disposed along the periphery of a circle of the same diameter as those other openings described above. In addition, since the thickness of the second plate member 96 is equal to the thickness of the disks 84, it fills the space between surface 90 and the lower surface 45 of the support plate 44, and only one disk can fit into each disk-receiving opening at a time. It is apparent that if a plate member 96 twice as thick were fitted in that space, then the article-receiving openings 98 could receive two disks, so that two disks would be discharged from each container whenever the mechanism was used. It can therefore be seen that the plate member 96 has the additional function of regulating the number of disks which can be discharged from each container each time the device or mechanism is used.

As seen in FIGURE 8, an arcuate slot 100 is formed in the second plate member 96. A screw pin 102, shown in FIGURE 4, extends through an opening 104 in plate member 58, projects into the slot 100, and is threaded in an opening in support plate 44. This pin has two functions: first of all, it prevents the first plate member 58 from rotating on bolt 60, and secondly, it limits the rotational freedom of the second plate member 96. The engagement of the pin 102 with the opposed ends 106 and 108 of slot 100, defines first and second positions for the plate member 96. The arrangement of slot 100 and the article-receiving openings 98 is such that when the second plate member 96 is in a first position, as seen in FIGURE 5, the disk-receiving openings 98 will be aligned with the mouths 82 of the containers and the openings 72 in the support plate 44, so that the disks 84 in each container adjacent the mouth 82 will be forced into the disk-receiving openings by the weight 86. As seen in FIGURE 6, when the second plate member 96 is rotated to the second position, the disk-receiving openings 98 will be aligned with the outlet openings 94 in the first plate member 58, so that any disk in the disk-receiving opening 98 will be carried along with the plate member 96 and when the plate member 96 reaches its second position, these disks will leave the apparatus through openings 94.

The portions 110 of the sheet material adjacent the opposite sides of the disk-receiving openings comprise first and second closure portions, see FIGURES 5, 6, and 8. These closure portions alternately and simultaneously seal the outlet openings 94 in the first plate member 58, when the second plate member 96 is in its first position, see FIGURE 5, and they simultaneously seal the openings 72 in support plate 44 and the container openings 72 when the second plate member is in a second position, see FIGURE 6. By this arrangement, it is apparent that the contents of the containers are never directly exposed to air, as long as plate member 96 is in its first or second position so that disks, or other articles in the containers, may be stored there for a considerable period substantially free from contamination by the air. In summary then, the simple unitary second plate member has three important functions: it regulates the number of disks to be discharged from the containers; it carries disks from the containers to the outlet openings 94; and it seals the containers and the outlet openings to protect the articles in the container from contamination by the surrounding air.

As described above, the second plate member is generally circular, but it is provided with an integral radially projecting handle 112 so that the plate member 96 may be conveniently moved from a first to a second position, see FIGURE 1. A coil spring 114 is connected at one end to handle 112 and at the other end to a stud 116 mounted on the top surface 13 of the base member 12. This spring biases the second plate member toward its first position and is strong enough to cause the plate member 96 to automatically rotate back to a first position after it has been manually rotated to its second position, thereby preventing contamination of the articles in the container.

As an example of a typical operation of this device, each container is filled with a stack of paper disks, and each stack of disks is impregnated with a different antibiotic. Then a Petri dish filled with a bacterial culture growing in a suitable medium is positioned between guide members 16 and 18 on the base member 12, as shown in FIGURE 9. Next, the handle 112 is used to move the second plate member 96 from its first position to its second position and then back again. This movement, as described above, permits the disks 84 which are received in the disk-receiving openings 98 to be forced along the surface 90 of the first plate member 58, until they fall through the outlet openings 94 and into the Petri dish, as shown in FIGURES 5 and 6. All the disks fall into the Petri dish simultaneously and quickly so that the exposure time for the bacterial culture is very short. In addition, because the outlet openings 94 are disposed along the periphery of a circle, these disks 84 will likewise be distributed along the periphery of a circle and in uniformly spaced relationship, as shown in FIGURE 9. Then the tests are completed in the usual way as described above.

This apparatus is very flexible in operation because it permits any combination of the large numbers of different antibiotics which are currently available to be combined together in a single test. In practice, the paper disks impregnated with these different kinds and concentrations of antibiotics would be prepared in advance and stored either in these containers 78, or in others which may be suitable. Then, when a group of bacterial agents are selected to be tested on a colony of bacteria, their containers 78 are mounted on the suport 42 in the above-described manner.

As stated above, it is sometimes necessary for the spacing between the adjacent bacterial agents being tested to be increased in order to prevent interference between their zones of inhibition. With this apparatus the spacing between the adjacent disks can be conveniently altered simply by reducing the number of containers to be mounted on the support, and mounting the containers to be used in the openings on the support in accordance with the spacing requirements. Although in this particular embodiment the spacing between adjacent containers can be altered only by a limited number of discrete amounts, a system of mounting the containers on the support could be provided which would permit a continuous variation of the spacing between them.

Under some circumstances, it may be desirable to use the support 42 and its associated disensing mechanism independently of the base 12 by simply carrying it to a Petri dish, for example, and operating the handle 112 to deposit the disks. When this happens, the circular shape of plate member 58 is useful because it helps center the support 42 on such a Petri dish. It is evident that conventional centering means could be added to support 42 if circumstances should warrant it.

The invention may be embodied in other forms without departing from the spirit or essential characteristics thereof as set forth in the claims. For example, the vials of paper discs may be arranged in a linear row rather than in a circular path, and use may be made of dispensing means 96 of the type described embodying linear displacement for removing the lowermost disc in the stack from the stack to the delivery opening 94 in plate 58, thereby to deposit one or a series of discs in a row onto an underlying receiving surface.

It will be understood that invention exists not only in the dispenser but that new and novel concepts are embodied in the sealed vials containing a stack of discs with a weighted member therein for displacement or with a locking arm 80 for anchoring the vial in position of use. The present embodiment is therefore to be considered as illustrative and not restrictive, and it is intended to include all changes which come within the scope and range of the claims.

It is claimed:

1. An aparatus of the class described comprising in combination a plurality of elongated tubular containers, each container closed at one end, a positioning lug formed on its outer periphery adjacent the open end of said container, a support, said support having a plurality of openings formed therein shaped to correspond to the cross-section of the container and the lug to enable the container and lug to be displaced therethrough into position of use, each opening adapted to receive a container, said containers mounted in said openings with each positioning lug underlying said opening to engage a portion of said support but without attachment thereto to releasably retain the containers thereon, and a contamination-resistant sealing means and dispensing mechanism associated with said support adjacent each container mouth for dispensing any articles carried in said container and substantially preventing free access of air to the open ends of the containers to prevent contamination of the articles stored therein.

2. An apparatus of the class described comprising in combination a plurality of elongated tubular containers, each container circular in cross-section and closed at one end so that it can store therein a stack of paper disks, a radially outwardly projecting positioning lug extending from the outer periphery of the containers adjacent their open ends, a support, said support having a plurality of openings formed therein shaped to correspond to the cross-section of the container and the lug to enable the container and lug to be displaced therethrough into position of use, each opening adapted to receive a container, said containers mounted in one of the openings on said support with said outwardly projecting glass positioning lug underlying said opening to engage a portion of said support but without attachment thereto to retain the containers thereon, and a contamination-resistant sealing means and dispensing mechanism associated with said support adjacent each container mouth for dispensing any articles carried in said container and substantially preventing free access of air to the open end of the container to prevent contamination of the articles stored therein.

3. An apparatus of the class described comprising a support, a plurality of dispensing containers mounted on said support, each container having a container mouth through which the articles stored therein can pass, and a contamination-resistant dispensing mechanism for said containers, said dispensing mechanism comprising a first member connected to said support, said first member having opposed surfaces, one of said opposed surfaces spaced from and facing said container mouths, a plurality of outlet openings extending through said first member, each outlet opening offset from one of said container mouths, a second member movable to a first and second position in the space between said one surface of the first member and said container mouths, said second member having a plurality of article-receiving openings formed therein corresponding in number to the number of containers adapted to be mounted on said support and sized to receive the articles stored in the containers which are to be dispensed, said article-receiving openings positioned so that when the second member is in a first position the articles in the containers can pass through their respective container mouths into one of the article-receiving openings, and when the second member is in a second position each article-receiving opening will communicate with an outlet opening in said first member so that any article in the article-receiving opening which is carried along with the second member as it moves to its second position can leave the apparatus through said outlet openings, said second member having first and second closure portions adjacent each article-receiving opening for alternately and simultaneously sealing the outlet openings in said first member when said second member is in a first position and sealing all the container mouths when said second member is in a second position in order to prevent contamination of the articles stored in the dispensing container.

4. The apparatus set forth in claim 3 including means for regulating the number of articles to be dispensed from each dispensing container each time the second member moves from its first to its second position.

5. An apparatus of the class described comprising a support, a plurality of dispensing containers mounted on said support, each container having a container mouth through which the articles stored therein can pass, and a contamination-resistant dispensing mechanism for said containers, said dispensing mechanism comprising a first member connected to said support, said first member having opposed surfaces, one of said opposed surfaces facing the container mouths and spaced therefrom by a distance substantially equal to the thickness of the articles to be dispensed, a plurality of outlet openings extending through said first member, each outlet opening offset from one of said container mouths, a second member formed from sheet material and substantially equal in thickness to the articles to be dispensed, said second member movable between a first and second position in the space between said one surface of the first member and said container mouths, said second member having a plurality of article-receiving openings formed therein corresponding in number to the number of containers adapted to be mounted on said support and sized to receive the articles to be dispensed, said article-receiving openings positioned so that when the second member is in a first position the articles in the containers can pass through their respective container mouths into one of the article-receiving openings and when the second member is in a second position each article-receiving opening will communicate with an outlet opening in said first member so that any article in the article-receiving opening which is carried along with the second member as it moves to its second position can leave the apparatus through the said outlet openings, said second member having first and second closure portions adjacent each article-receiving opening for alternately and simultaneously sealing the outlet openings in said first member when said second member is in a first position and sealing all the container mouths when said second member is in a second position in order to prevent contamination of the articles stored in the dispensing container.

6. An apparatus of the class described comprising a support, a plurality of dispensing containers filled with a stack of paper disks impregnated with a biological agent, each dispensing container having means therein for urging the disks they hold through a container mouth, said containers mounted on said support with the container mouth in a substantially common plane, and a contamination-resistant dispensing mechanism for said containers, said mechanism comprising a first member connected to said container, said first member having opposed surfaces with a plurality of outlet openings extending therethrough, each outlet opening offset from a container opening, one of said opposed surfaces facing hte container opening and spaced therefrom by a distance substantially equal to the thickness of the disks to be dispensed, a second member formed from sheet material and substantially equal in thickness to the disks to be dispensed, said second member movable between a first and second position in the space between the container mouths and said one surface of said first member, said second member having a plurality of disk-receiving openings formed therein, said openings corresponding in number to the number of containers adapted to be mounted on said support and sized to receive the disks stored in the containers, said disk-receiving openings positioned so that when the second member is in a first position the disks next to be dispensed can pass through their respective container openings into one of the disk-receiving openings, and when the second member is in a second position each disk-receiving opening will communicate with an outlet opening in the first member, portions of the sheet material of the second member adjacent each of the disk-receiving openings operating as first and second closure portions for alternately sealing the outlet openings in said first member when said second member is in a first position and simultaneously sealing all the container openings when the second member is in said second position in order to prevent contamination of the disks stored in the dispensing container, mean connected to said second member for shifting it from the first to the second position and carrying the disks in the disk-receiving openings therealong so that they may leave through the outlet openings in the first member.

7. The apparatus set forth in claim 1 wherein the outlet openings in said first member are disposed in a predetermined spaced relation to each other so that all the disks being dispensed by the containers are deposited simultaneously and in a predetermined relationship with respect to each other.

8. A contamination-resistant dispensing mechanism for at least one dispensing container comprising a first member adapted to be held in fixed relation to said dispensing container, said first member having opposed surfaces with at least one outlet opening extending therethrough and adapted to be positioned so that the outlet opening is offset from the mouth of said dispensing container and so one of said opposed surfaces is spaced from and facing the mouth of said dispensing container, a second member movable to a first and second position on said one surface of said first member, said second member having an article-receiving opening formed therein which is adapted to be sized to correspond to the size of the articles to be dispensed, said article-receiving opening positioned so that when the second member is in a first position the articles to be dispensed can pass through the mouth of the container into said article-receiving opening, and when the second member is in a second position the article-receiving opening and the outlet opening in the first member can communicate with each other so that any article in the article-receiving opening which is carried along with the second member as it moves to its second position will enter and pass through said outlet opening, said second member having first and second closure portions adjacent each article-receiving opening for alternately and simultaneously sealing the outlet openings in said first member when said second member is in a first position and adapted to seal the mouth of said dispensing container when said second member is in a second position so it can prevent contamination of the articles stored therein.

9. A contamination-resistant dispensing mechanism for at least one dispensing container comprising a first member adapted to be held in fixed relation to said dispensing container, said first member having opposed surfaces with at least one outlet opening extending therethrough and adapted to be positioned so each outlet opening is offset from the mouth of each dispensing container and so one of its opposed surfaces is spaced from these mouths by a distance substantially equal to the thickness of the articles to be dispensed, a second member formed from sheet material and substantially equal in thickness to the articles to be dispensed, said second member movable between a first and second position on said one surface of said first member and having at least one article-receiving opening formed therein which is adapted to be sized to correspond to the size of the articles to be dispensed, said article-receiving opening positioned so that when the second member is in a first position the articles next to be dispensed can pass through the container opening into said article-receiving opening, and when the second member is in a second position the said article-receiving opening communicates with one of the outlet openings so that any article in the article-receiving opening which is carried along with the second member as it moves to its second position will enter and pass through said outlet opening, said second member having first and second closure portions adjacent each article-receiving opening for alternately and simultaneously sealing the outlet openings in said first member when said second member is in a first position and adapted to seal the mouth of each dispensing container when said second member is in a second position so it can prevent contamination of the articles stored therein.

10. A contamination-resistant dispensing mechanism for at least one dispensing container filled with a stack of paper disks impregnated with a biological agent comprising a support, said support having a planar surface and at least one opening extending through the planar surface in said support for receiving the open end of each dispensing container, said opening in said support defining a container mouth, a first member connected to said support, said first member having opposed surfaces with at least one outlet opening extending therethrough, said outlet opening offset from each container mouth in said support and positioned so that one of its opposed surfaces is parallel to and spaced from the planar surface on said support by a distance substantially equal in thickness to the paper disks to be dispensed, a second member formed from sheet material and substantially equal in thickness to the paper disks to be dispensed, said second member movable to a first and second position between said one surface of said first member and said planar surface on said support and having at least one disk-receiving opening formed therein which is sized to correspond to the disks to be dispensed, said disk-receiving opening positioned so that when the second member is in a first position the disks next to be dispensed can pass through the container opening into said disk-receiving opening and when the second member is in a second position the said disk-receiving opening communicates with one of the outlet openings so that any disk in the article-receiving opening which is carried along with the second member as it moves to its second position will enter and pass through said outlet opening, said second member having first and second closure portions adjacent each article-receiving opening for alternately and simultaneously sealing the outlet openings in said first member when said second member is in a first position and sealing the mouth of each container on said support when said second member is in a second position so it can prevent contamination of the disks to be stored therein.

11. A machine for distributing disks impregnated with biological agents comprising in combination a base member, a first guide means on said base member adapted to locate a Petri dish in a predetermined position thereon, including a pair of laterally spaced apart guide members between which the Petri dish is adapted to be displaced, and means mounting at least one of said guide members for displacement relative to the other to adjust the first guide means to automatically accommodate it to Petri dishes of varying dimensions, a second guide means perpendicular to said base member comprising vertically disposed guide posts, a support operatively engaging said guide posts for movement between raised and lowered positions, said support adapted to carry a plurality of dispensing containers filled with a stack of paper disks impregnated with a biological agent, and a contamination-resistant dispensing mechanism connected to said support, said dispensing mechanism operating to simultaneously release a plurality of paper disks impregnated with biological agents from any dispensing containers which are carried by said support and distribute them in a predetermined spaced relationship on the Petri dish on said base member when the support is in lowered position in vertical alignment with said Petri dish.

12. An apparatus of the class described comprising in combination a plurality of elongated tubular containers closed at one end and open at the other, a positioning lug extending outwardly from a side wall of each of the containers adjacent the open end of the container, a support having a pair of positioning plates arranged in spaced parallel relation with the spacing between the plates being dimensioned to receive the positioning lug in mounting relationship therebetween, with each of the plates having a plurality of aligned openings with the openings in the plates corresponding to the outer wall to wall dimension of the containers and with the openings in one plate having contiguous openings shaped to correspond to the lug to permit passage of the container with the positioning lug therethrough, said containers being mounted on said plates with the positioning lugs disposed between said plates and offset circumferentially from the lug shaped opening in the one plate and with the open end of the container in endwise alignment with the aligned opening in the other plate.

References Cited in the file of this patent

UNITED STATES PATENTS

| | | |
|---|---|---|
| 1,270,095 | Baehr | June 18, 1918 |
| 1,451,119 | Schroeder et al. | Apr. 10, 1923 |
| 1,544,862 | Rogers | July 7, 1925 |
| 1,761,164 | Wilson | June 3, 1930 |
| 2,187,429 | Newey | Jan. 16, 1940 |
| 2,378,205 | Fevas | June 12, 1945 |
| 2,434,993 | Dwuyer | Jan. 27, 1948 |
| 2,538,684 | Gushard et al. | Jan. 16, 1951 |
| 2,604,245 | Shaw | July 22, 1952 |
| 2,630,245 | Maier | Mar. 3, 1953 |
| 2,653,850 | Voliten | Sept. 29, 1953 |
| 2,694,495 | Faures | Nov. 16, 1954 |
| 2,698,682 | Bodan | Jan. 4, 1955 |
| 2,851,191 | Semsch | Sept. 9, 1958 |
| 2,865,156 | Wolfson | Dec. 23, 1958 |
| 2,889,674 | Hamilton et al. | June 9, 1959 |